Patented Feb. 27, 1951

2,543,061

UNITED STATES PATENT OFFICE 2,543,061

HAIR-DRESSING COMPOSITION

Theodore H. Rider, Hinsdale, and Solomon D. Gershon, Chicago, Ill., assignors to Lever Brothers Company, Cambridge, Mass., a corporation of Maine No Drawing. Application May 19, 1947, Serial No. 749,082

14 Claims. (Cl. 167—87)

This invention relates to a composition of matter comprising an oil phase and a water phase which are readily emulsifiable upon slight agitation and will remain emulsified for a short time to permit use in emulsion form, but following which the emulsion will break quickly to form an oil phase and an aqueous phase with a clear interface between the phases.

In certain types of compositions it is desirable to have both water and oil. For example, in a dressing to be applied to the hair it is desirable to include an oil to supplement the natural hair oils. It is also desirable to include water in the composition because the application of water to the hair facilitates combing it, as is well known.

The formulation of a composition containing both oil and water, which has all of the desirable properties from a utilitarian as well as an aesthetic point of view, presents a number of difficulties. Because of their immiscibility, difficulties arise in application to the hair of both oil and water in the correct proportions unless they are applied in the form of an emulsion. However, oil and water emulsions which maintain their permanency over a long shelf life present a number of difficulties and are not as ideal as might be assumed. Furthermore, such a permanent emulsion is undesirable as a hair dressing because the component in the inner phase of such a permanent emulsion does not reach the hair. In addition, the maintenance of the oil in emulsion formed over long periods contributes to its deterioration since the water and the components in the aqueous phase often have pro-oxidant effects when in the intimate contact characteristic of a tight emulsion.

It is an object of the invention, therefore, to prepare a composition containing an oil phase and an aqueous phase which are readily miscible to form good emulsion upon slight agitation and to maintain the emulsion for time to permit application to the hair, following which the emulsion applied to the hair breaks so that both components may reach the hair and the remaining emulsion in the container breaks to form an oil phase and an aqueous phase with a clear interface.

As a result of the invention, the oil phase and the water phase are maintained separate in the container, except for a single interface where the two layers join. The interface area is extremely small as compared with the area of contact in an emulsion, especially when the volume of the two liquids is considered. When the composition is used it is generally in a bottle and upon shaking the bottle for a matter of a few seconds a good emulsion is formed between the two phases. This is maintained for sufficient length of time to pour the requisite amount of emulsion from the bottle and apply it. As a result, the correct proportions of the oil phase and water phase may be dispensed and applied. The emulsion so formed, while it is an excellent emulsion for the purpose described, is nevertheless fairly short lived. This is highly desirable since it permits the two phases of the applied emulsion to separate after application to the hair, and also permits separation of the two phases of the emulsion in the bottle during the times between use, with the advantages noted above.

The problem of making a composition which will readily emulsify with a minimum of agitation, will maintain the emulsion for a given period, and then break quickly, presents a number of difficulties. Generally if a good emulsion is to be formed quickly, a very good emulsifying agent is required and the composition has a tendency to remain emulsified for a considerable period of time if, in fact, the emulsion breaks at all. On the other hand, if the composition is formulated so that the emulsion breaks quickly, it generally requires extensive agitation over a long period of time to form a good enough emulsion for initial use. Either form is undesirable for the purposes mentioned.

Another problem in connection with compositions of this type is that even though the requirement for quick emulsification and ready breaking of the emulsion are met, there is a tendency for a third phase to form between the oil and the water phase after repeated uses of the emulsion. This may include small amounts of materials extracted from the oil or from the water or from both. These materials may be solid or appear as solids and may have a color different than that of the oil or water. As a result, the accumulation of this material in the intermediate phase detracts from the appearance of the composition, and while it may not interfere with the use of it, it may give the user the impression that the composition is deteriorating in some way.

It is a further object of my invention, therefore, to so treat the composition during its formulation so that although the composition may be emulsified and the emulsion broken innumerable times, there will be no formation of an ill-appearing intermediate phase, and the composition will maintain a clear and sharp interface between the oil and the water phases uncontaminated by any extraneous material.

The above objects of the invention are accomplished by including in the oil phase a particular oil-soluble emulsifying agent and by including in the water phase a particular water-soluble emulsifying agent. These two emulsifying agents in the separate phases coact to produce the desirable emulsifying and emulsion breaking properties described heretofore.

Inasmuch as the oil preferred is a vegetable oil normally subject to the development of rancidity, as is characteristic of all vegetable oils it is preferred to include an antioxidant in the composition, even though the oxidation of the oil is minimized because of the quick emulsion breaking properties described heretofore.

In accordance with the invention, there is included an oil-soluble antioxidant in the oil phase and a water-soluble antioxidant in the water phase. Although these antioxidants are in different phases, and even on emulsion are not brought in contact with each other except at the surface interface of the emulsion, there is an enhanced coaction between the two antioxidants beyond that obtained with the use of either alone in their respective phases, or which might be expected considering that the opportunity for contact between the oil-soluble antioxidant and the water-soluble antioxidant is very restricted because of their different solubilities and the separate phases in which they are contained.

The following formula sets forth a preferable embodiment of the invention. After this is set forth the various modifications which may be made in the formulation as well as the several ingredients without departing from the invention.

Oil phase

| | Parts by weight |
|---|---|
| Olive oil | 7.64 |
| Oil-soluble emulsifier | 0.33 |
| Concentrate of natural mixed tocopherols (34% concentration) | 0.08 |
| Perfume | 0.21 |

Water phase

| | Parts by weight |
|---|---|
| Ethyl alcohol | 40.50 |
| Water | 49.80 |
| Water-soluble quaternary ammonium compound | 0.34 |
| Sodium chloride | 1.07 |
| Sodium bitartrate | 0.03 |

Referring to the formulation, the oil phase is prepared by adding the oil-soluble emulsifying agent to the olive oil. The oil containing the oil-soluble emulsifier is then thoroughly mixed and agitated with water, following which the oil is separated from the water by standing or by centrifugation. If desired, the mixture may be saturated with carbon dioxide before separation. This action may be repeated once or as many times as desired. During this refining treatment, some of the non-oil components of the oil, which are believed to be gums, phosphoproteins, or other non-fatty components separate from the oil into the water phase. The treatment is repeated until all of the components of this type are removed from the oil, so that a clear interface is obtained. The components removed in this type of refining are those, which if left in the oil, would form the undesirable contaminating third phase between the oil and water phases in the finished product. The oil refined in this manner is free from these contaminating properties, irrespective of the shelf life and extent of use of the final composition. It is believed that the presence of the particular emulsifier in the oil is responsible for the separation of these impurities in the water during the refining, since if the oil without the emulsifier is treated with water, these impurities are not separated in the water phase. The presence of carbon dioxide also facilitates the removal of the impurities, although this is an optional and unnecessary refinement. As far as is known, the refining of oil to remove gums, phosphoproteins and other non-fatty impurities, when the oil contains an oil-soluble emulsifier which is intended to and does remain as a component of the oil is a novel refining process.

Preferably the tocopherols and the perfume are included in the oil phase before it is refined in this manner, since any impurities in either the tocopherols or the perfume which would contaminate the interface in the product will also be removed in accordance with the refining process.

The aqueous phase is then made up by dissolving the quaternary ammonium compound with sodium chloride and with the sodium bitartrate in the alcohol and water mixture and added to the oil phase. The mixture is agitated and may be filtered if desired and the temporary emulsion is then filled into bottles.

The olive oil may be replaced in whole or in part by any non-drying vegetable oil such as cottonseed oil, peanut oil, soybean oil, castor oil, etc. Olive oil is preferred. The amount of the oil may be varied at will depending on the amount of oily residue the user desires to leave upon the hair. It usually would be not more than half the mixture.

The emulsifier must be soluble in the vegetable oil, and is a partial fatty acid ester of a polyhydroxy compound containing a plurality of free hydroxy groups. A preference is expressed for the partial fatty acid esters of polyalkylene oxide derivatives of a polyol in which the fatty acid radicals are less in number than the free hydroxy groups in the partial ester. The alkylene radical contains two to four carbon atoms, inclusive. The polyol is defined as a hexose, a polyhexose, a hexitol, a polyhexitol or other aliphatic compound of carbon hydrogen and oxygen containing 6 to 12 carbon atoms, inclusive, and a plurality of hydroxy groups.

For example, propylene glycol glycoside, when treated with ethylene oxide, reacts to introduce ethanol groups through an ether linkage by reaction through the hydroxy groups of the glycoside. The number of such ethanol groups depends upon the proportions of the reactants and is not critical. The partial fatty acid ester is formed by esterifying one or more of the hydroxy groups with fatty acid radicals. Any hexose or polyhexose may be the basis of the glycoside. Preferably the derivative is the partial fatty acid ester of a polyethylene oxide derivative of propylene glycol glucoside in which the number of fatty acid radicals is less than the number of free hydroxy groups in the partial ester. This composition is available commercially.

The oil-soluble emulsifier for which a preference is expressed may be a mixture, and small amounts of other ingredients may be formed and included, such as the partial fatty acid esters: of polyglycols, of hydroxy ethylene (ethanol) ethers of propylene glycol glycosides of polyglucosides and of hydroxy ethylene ethers of polyglucose. The primary component, however, is the partial fatty acid ester of hydroxy ethylene ether of propylene glycol glucoside.

The fatty acid used in forming the partial ester may be any fatty acid having 12 or more carbon atoms and may be saturated or unsaturated, such as lauric, myristic, palmitic, oleic, and stearic acids. These are referred to as "higher fatty acids." A preference is expressed for oleic acid since this gives the emulsifier optimum solubility properties in the oil. The amount of the oil-soluble emulsifier will vary somewhat with the exact compound or composition used and the number of hydroxy groups. The amount will also be dependent somewhat on the rapidity with which the emulsion is desired to be formed upon shaking and the length of time desired for the emulsion to break. The amounts in general will fall within plus or minus 25% of the optimum expressed in the formula, and the ratio to the oil should be kept in about the same range and can be selected within this range, depending upon the precise emulsion forming and breaking properties desired.

The tocopherols (vitamin E) may be naturally-occurring or formed synthetically and those most readily available are a mixture of natural tocopherols isolated by distillation from naturally-occurring oils. The amount used depends somewhat on the extent of the antioxidant action desired and the susceptibility of the oil to rancidity development. There is no advantage in using more than enough to obtain the antioxidant action.

The antioxidant is not an essential component of the composition. If it is not desired to protect the oil against rancidity, or if the oil in its natural form is such as to resist rancidity for the purpose, the tocopherols may be omitted without affecting the emulsion forming and breaking characteristics of the composition. However, most oils should be protected against oxidation and the inclusion of the tocopherols together with the complementary antioxidant in the aqueous phase is a preferred embodiment of the invention.

Any oil-soluble perfume may be used and the small amount used may vary widely, depending upon odor characteristics of the perfume and the extent and nature of the odor desired. The perfume may consist of a phenolic material or compounds which comprise phenols and the phenolic component of the perfume will also act as an antioxidant in conjunction with or supplementary to the tocopherol. If the tocopherol is not used the phenol constituents of the perfume will add antioxidant characteristics to the composition and will coact with the antioxidants in the aqueous phase. The aqueous phase is composed primarily of alcohol and water. Ethyl alcohol, which may be appropriately denatured for the purpose, is suitable; or propyl or isopropyl alcohol may be used. The water may be ordinary tap water or distilled water. The proportions of alcohol and water may be varied relative to each other.

The alcohol causes the composition to dry quicker, it imparts a stimulating effect to the scalp, and it causes the emulsion to break faster than an all water aqueous phase. Depending on the effects wanted, the relative amount of water to alcohol can be varied at will. If the alcohol in the alcohol-water phase is increased sufficiently, the specific gravity of this phase will become lower and the aqueous phase may be the upper phase. Irrespective of which phase is on top, the relative specific gravity of the oil phase and aqueous phase should be adjusted relative to each other to obtain the desired rapidity of separation. This total amount of the aqueous phase is the complement of the oil phase.

The quaternary compound may be any cationic surface active compound comprising an aliphatic radical containing at least 12 carbon atoms, and has the general formula

where R is an aliphatic radical containing a total of at least 12 carbon atoms and X is an ion of a strong acid such as —Cl or —HSO$_4$. The three valences attached to the nitrogen may be satisfied by the same or different radicals, for example the compound may be the trialkyl such as trimethyl ammonium salt, or an alkyl piperidinium salt or a pyridinium salt. The permissable variations within the aliphatic radical are too numerous to mention. A preferred type is

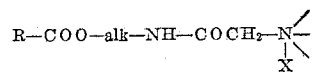

Within this type the compound

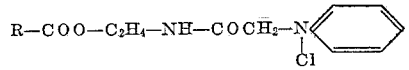

is the preferred embodiment. R may be a hydrocarbon radical having from 11 to 17 carbon atoms. When the latter type of compound is used, the composition has antiseptic properties which is characteristic of these compounds.

The quaternary ammonium compound in the aqueous phase coacts with the oil-soluble emulsifier in the oil phase to produce the emulsion and breaking properties described heretofore. The amount of the quaternary ammonium compound employed may be varied in relation to the amount of the oil-soluble emulsifier, the particular configuration in the quaternary ammonium compound, and the emulsion and breaking action desired. In general the amount is in the range of plus or minus 25% of the optimum amount expressed in the formula.

The sodium chloride may be omitted if desired. It may also be replaced by a mixture of sodium tartrate and bitartrate, thereby also increasing the antioxidant activity.

The sodium bitartrate may be replaced by tartaric acid, the neutral sodium tartrate, or the corresponding potassium salts. Other acids such as citric acid and salts thereof may be used. In general, any hydroxy dicarboxylic acid may be employed such as tartaric acid, citric acid, tartronic acid, malic acid, hydroxy succinic acid and their neutral or acid alkali metal salts. The acid or salt thereof is employed in an antioxidant capacity and functions with particular effectiveness when the oil phase contains the tocopherol. This component may be omitted if antioxidant action is not desired and when included the amount is not critical, since it can comprise the total salt content.

There has been indicated heretofore the preferred embodiment of the invention together with such variations as may be made therein, without departing from the essential features thereof and all such modifications and variations are intended to be included within the following claims.

We claim:

1. An oil and water composition suitable for use as a hair dressing comprising 7.6 to 50% by weight of oil and 0.25 to 0.41% of an oil-soluble partial fatty acid ester of a polyhydroxy compound as emulsifier in an oil phase comprising a non-drying vegetable oil as the primary ingredient and the balance being substantially 0.26 to 0.43% of a cationic surface active quaternary ammonium compound in an aqueous phase comprising alcohol, said composition being readily emulsifiable upon agitation to provide a good meta-stable emulsion which readily separates upon standing to form an oil layer and an aqueous layer.

2. The composition of claim 1 containing an oil-soluble antioxidant.

3. The composition of claim 1 wherein the polyhydroxy compound is a polyalkylene oxide derivative of a polyol.

4. The composition of claim 3 containing a tocopherol as an antioxidant.

5. The composition of claim 3 wherein the oil is 7.64% of olive oil, the amount of the oil-soluble emulsifier is 0.33% and the polyol is a propylene glycol glucoside, and the quarternary ammonium compound is 0.34% of a higher fatty pyridinium salt of a mineral acid.

6. The composition of claim 5 containing a tocopherol as an antioxidant.

7. The composition of claim 5 wherein the quarternary ammonium compound is of the formula

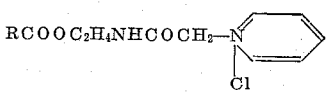

where R is an aliphatic hydrocarbon radical of 11 to 17 carbon atoms.

8. The composition of claim 7 wherein the oil-soluble emulsifier is an oleic acid derivative of the polyhydroxy compound.

9. The composition of claim 7 containing 0.27% of tocopherol as an antioxidant.

10. The composition of claim 7 wherein the oil-soluble emulsifier is a lauric acid derivative of the polyhydroxy compound.

11. The composition of claim 7 wherein the oil-soluble emulsifier is a myristic acid derivative of the polyhydroxy compound.

12. The composition of claim 7 wherein the oil-soluble emulsifier is a palmitic acid derivative of the polyhydroxy compound.

13. The composition of claim 7 wherein the oil-soluble emulsifier is a stearic acid derivative of the polyhydroxy compound.

14. The composition of claim 13 containing 0.27% of tocopherol as an antioxidant.

THEODORE H. RIDER.
SOLOMON D. GERSHON.

REFERENCES CITED

The following references are of record in the file of this patent:

UNITED STATES PATENTS

| Number | Name | Date |
|---|---|---|
| 2,295,505 | Shelton | Sept. 8, 1942 |
| 2,334,709 | Katzman | Nov. 23, 1943 |
| 2,363,722 | Faust | Nov. 28, 1944 |
| 2,382,398 | Cordero | Aug. 14, 1945 |
| 2,391,041 | Stamberger | Dec. 18, 1945 |
| 2,398,295 | Epstein et al. | Apr. 9, 1946 |

OTHER REFERENCES

Harry, Modern Cosmeticology Chemical Publishing Co. Inc., N. Y., 1940, pages 225, 226, 149, 143.

Rosenberg, Chemistry and Physiology of the Vitamins, Interscience Publishers, Inc., N. Y., 1942, page 440.

Sollman, A Manual of Pharmacology, 1942, 6th ed., W. B. Saunders Co., N. Y., page 896.

Certificate of Correction

Patent No. 2,543,061 February 27, 1951

THEODORE H. RIDER ET AL.

It is hereby certified that error appears in the printed specification of the above numbered patent requiring correction as follows:

Column 8, list of REFERENCES CITED, under the heading OTHER REFERENCES insert the following:

*Ring—Manufacturing Chemist, Sept. 1941, pages 211–214.*
*Science—June 28, 1940, Volume 91, No. 2374, pages 624–625. (Copy in P. O. S. L.)*;

and that the said Letters Patent should be read as corrected above, so that the same may conform to the record of the case in the Patent Office.

Signed and sealed this 22nd day of May, A. D. 1951.

[SEAL]

THOMAS F. MURPHY,
*Assistant Commissioner of Patents.*